Figure 1:
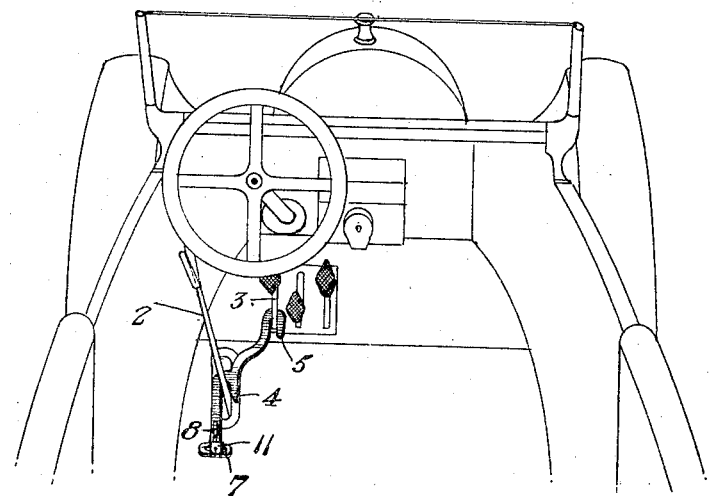

F. A. MILLER.
MOTOR LOCK.
APPLICATION FILED MAY 5, 1919.

1,316,587.

Patented Sept. 23, 1919.

WITNESSES

INVENTOR
F. A. Miller,
BY
ATTORNEYS

UNITED STATES PATENT OFFICE.

FRANK ANTHONY MILLER, OF VINCENNES, INDIANA.

MOTOR-LOCK.

1,316,587.  Specification of Letters Patent.  Patented Sept. 23, 1919.

Application filed May 5, 1919. Serial No. 294,632.

*To all whom it may concern:*

Be it known that I, FRANK A. MILLER, a citizen of the United States, and a resident of Vincennes, in the county of Knox and State of Indiana, have invented certain new and useful Improvements in Motor-Locks, of which the following is a specification.

My invention is an improvement in locks for motor vehicles, and has for its object to provide a lock of the character specified, adapted to engage the clutch pedal and hand lever of a motor vehicle to lock the same when not in use, the device being so arranged that it may be swung out of the way when not in use.

In the drawings:—

Figure 2:
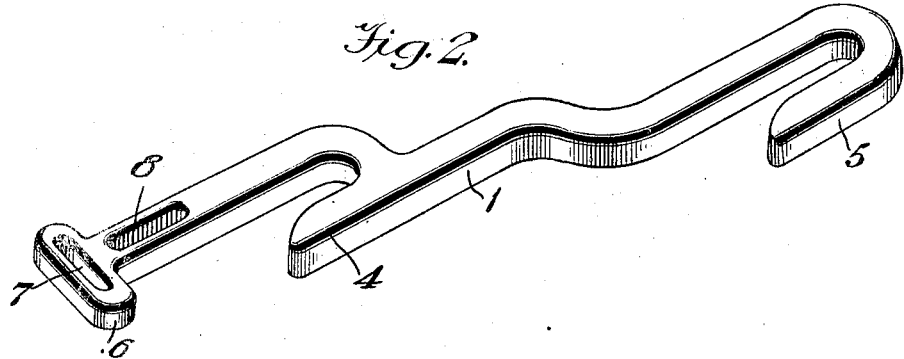
Figure 3:
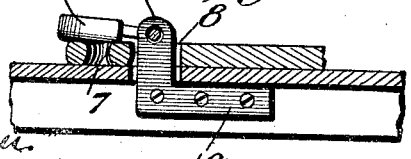

Figure 1 is perspective view of the controlling mechanism of a motor vehicle showing the lock in use and in locking position, Fig. 2 is a perspective view of the lock, Fig. 3 is a sectional view through the floor of the car, showing the staple and its mounting.

The present embodiment of the invention is shown in connection with a motor vehicle, the lock being used to lock the hand lever 2 and the clutch pedal 3 from movement when the vehicle is not in use. The improved lock comprises a bar 1, which has two hooks 4 and 5 for engaging about the hand lever and the clutch pedal.

As shown, the bar 1 is offset to properly position the hooks, and at the end remote from the hook 5, the bar has a cross head 6, and this cross head has a slot 7 extending transversely of the bar. The bar also has a longitudinally extending slot 8 adjacent to the cross head, and these slots are adapted to engage a staple 9 extending through the slot in the floor of the car.

This staple has an angular portion 10 which may be secured to the frame work of the body beneath the floor as shown in Fig. 3, and the staple is adapted to be engaged by the shackle of a pad lock 11, to lock the lock in operative or in inoperative position.

When in use, to lock the car, the hooks 4 and 5 are engaged with the levers 2 and 3 as shown in Fig. 1, and the slot 8 is slipped over the staple 9 as shown in Fig. 3. The shackle of the pad lock is now engaged with the staple, and it will be obvious that until this pad lock is released, the lock bar cannot be removed to permit the use of the lever.

When not in use, the slot 7 is engaged with the staple 9, and the pad lock is connected with the staple to hold the bar in a position substantially at right angles to that shown in Fig. 1.

I claim:—

In a motor vehicle, the combination with the hand lever and the clutch pedal, of a lock for said lever and pedal, said lock comprising a bar having hooks facing in the same direction for engagement in front of the pedal and the lever, a fixed staple, the bar having slots arranged at right angles with respect to each other for engagement by the staple to hold the bar in operative or in inoperative position, the staple being adapted for engagement by the shackle of a pad-lock.

FRANK ANTHONY MILLER.

Copies of this patent may be obtained for five cents each, by addressing the "Commissioner of Patents, Washington, D. C."